Figure 1:
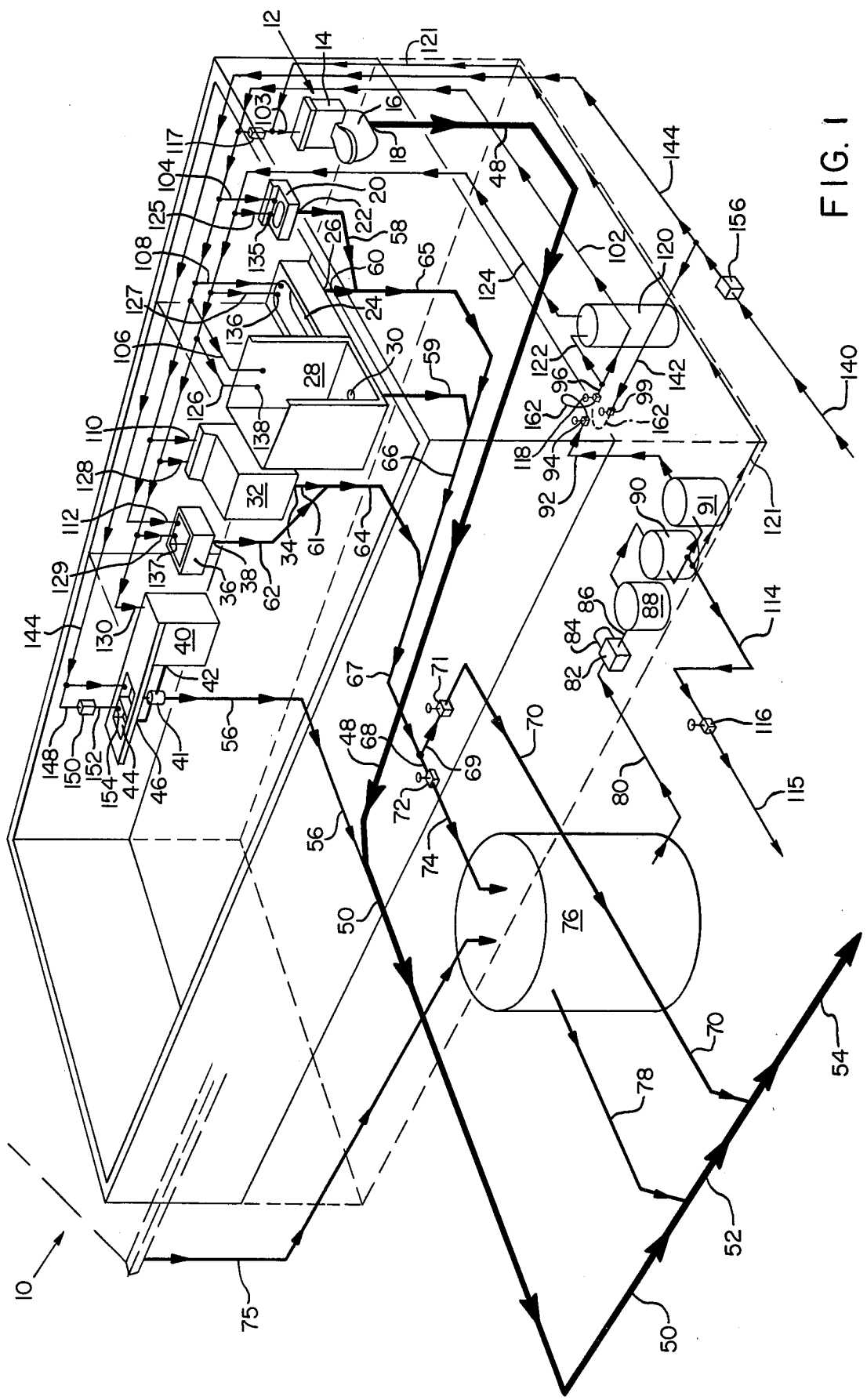

United States Patent [19]

Hanna

[11] 4,228,006
[45] Oct. 14, 1980

[54] DOMESTIC WATER SYSTEM

[76] Inventor: Daniel C. Hanna, P.O. Box 3736, Portland, Oreg. 97208

[21] Appl. No.: 951,329

[22] Filed: Oct. 16, 1978

Related U.S. Application Data

[63] Continuation of Ser. No. 817,735, Jul. 21, 1977, abandoned.

[51] Int. Cl.$^2$ .................. B01D 17/08; B01D 21/00
[52] U.S. Cl. .................................... 210/167; 210/170; 210/195.1
[58] Field of Search .................. 210/60, 152, 167, 170, 210/194–197, 209

[56] References Cited

U.S. PATENT DOCUMENTS

| | | | |
|---|---|---|---|
| 2,858,939 | 11/1958 | Corliss | 210/152 X |
| 3,318,449 | 5/1967 | Jennings et al. | 210/152 X |
| 3,543,294 | 11/1970 | Boester | 210/170 X |
| 3,711,381 | 1/1973 | Lagstrom | 210/152 X |
| 3,810,544 | 5/1974 | Armstrong et al. | 210/167 |
| 3,923,658 | 12/1975 | Lancaster | 210/167 X |
| 4,017,395 | 4/1977 | Davis | 210/167 |

OTHER PUBLICATIONS

Averill et al., *Vacuum Sewer Systems for Northern Applications*, 1973, pp. 258–304.
Gregory, *Waste Unit Uses Space Technique*, Aviation Week & Space Technology, 12/15/69, pp. 49 & 50.

*Primary Examiner*—Robert H. Spitzer
*Attorney, Agent, or Firm*—Klarquist, Sparkman, Campbell, Leigh, Hall & Whinston

[57] ABSTRACT

The specification discloses a domestic water system reclaiming waste water in which a tap water line supplies fresh water only to a kitchen sink and as a replenisher for a reclaim system supplying all the water to a toilet, a lavatory, a bath tub, a clothes washer, laundry tubs and a dishwasher. Drains from the toilet and the kitchen sink lead directly to a sewer, and drains from all the other installations lead to a clarifier tank having an overflow to the sewer. A pump pumps water from the clarifier tank through filter tanks to all the installations except the kitchen sink and to a hot water heater supplying the lavatory, the bath tub, the clothes washer, the laundry tubs and the dishwater. An inline instant hot water heater is positioned in the tap water line to a hot water tap of the kitchen sink.

5 Claims, 2 Drawing Figures

DOMESTIC WATER SYSTEM

This is a continuation, of application Ser. No. 817,735, filed July 21, 1977, now abandoned.

DESCRIPTION

The invention relates to an improved domestic water system, and has for an object thereof the provision of a new and improved domestic water system.

Another object of the invention is to provide a domestic water system in which drain water is reclaimed from waste water from non-solid discharges and reused for many of domestic water utilizing installations in the system.

A further object of the invention is to provide a domestic water system in which only toilet and kitchen sink discharge water is not reclaimed.

Figure 2:
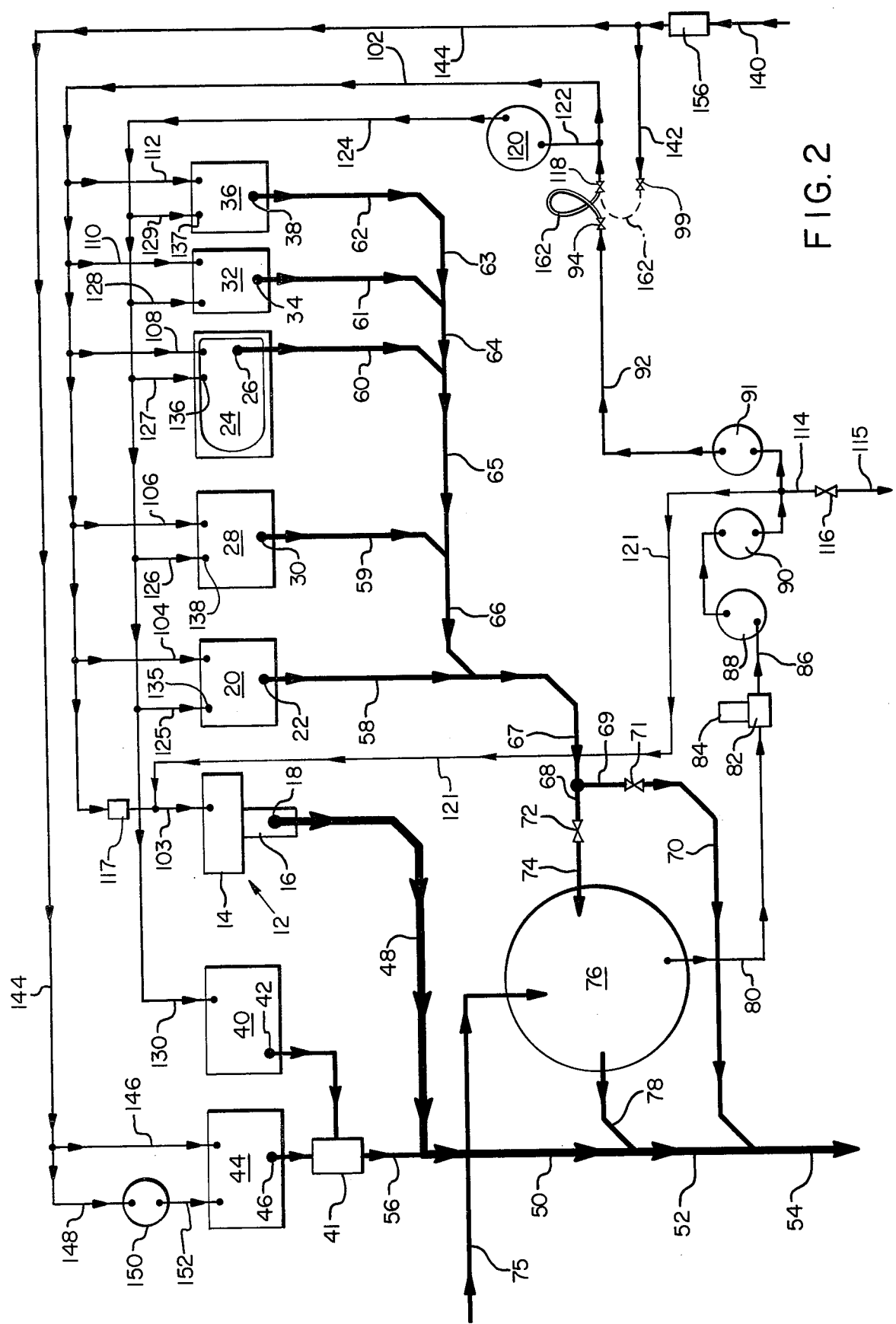

In the Drawings:

FIG. 1 is a schematic view of a house and a domestic water system forming one embodiment of the invention; and FIG. 2 is a schematic view of the system showing it somewhat differently from FIG. 1.

A domestic water system forming one specific embodiment of the invention is shown in a house 10, having a toilet 12, including a flush tank 14, a bowl 16 and a drain 18, a lavatory 20 having a drain 22, a bathtub 24 having a drain 26, a shower 28 having a drain 30, an automatic clothes washer 32 having a drain 34, laundry tubs or tray 36 having a drain 38, a dishwasher 40 having a drain 42 and a kitchen sink 44 having a drain 46.

The toilet 18 leads through drain pipes 48, 50 and 52 to a pipe 54 sloping to a sewer (not shown) and the drain 46 from the kitchen sink 44 is connected by a drain pipe 56 to the drain pipe 50. All the other drains are connected by drain pipes 58, 59, 60, 61, 62, 63, 64, 65, 66, 67, 68 and 69 to gate valves 71 and 72. A pipe 74 connects the valve 72 to the top portion of a large, sunken, holding or clarifier tank 76 into which chlorine is introduced through pipe 75 in measured quantities. The valve 71 is connected by a pipe 70 to the pipe 54. The tank 76 has near its top an overflow pipe 78 sloping to the pipe 54. An output pipe 80 leads from the bottom portion of the tank 76 to a pump 82 driven by an electric motor 84. The pump 84 pumps water from the tank 76 under pressure through a pipe 86 through filter tanks 88, 90 and 91 connected in series and under pressure to pipe 92 to shutoff valve 94. A hose 162 normally is connected to the shutoff valve 94, but can be connected to a shutoff valve 99. With the valve 94 open, the reclaimed water flows through the hose 162 to pipes 122 and 102. The pipe 102 leads to pipes 103, 104, 106, 108, 110, 112 and 114. The pipe 103 is the supply pipe of the flush tank 14, and the pipes 104, 106, 108, 110 and 112 are the cold water supply pipes leading to faucets (not shown) of the lavatory, the bathtub 24, the clothes washer 32 and the laundry tubs 36, respectively. The pipe 114 leads to a valve 116 and a pipe 115 having a yard faucet (not shown). A valve 118 is positioned in a pipe 96 leading to the pipe 102.

A hot water heater 120 has an inlet pipe 122 connected to the pipe 96 and a heater outlet pipe 124 connected by pipes 125, 126, 127, 128, 129 and 130 to hot water valves 135 and 136 of the lavatory, the shower and the bathtub and to hot water inlet of the clothes washer, a hot water tap of the laundry tubs and to the dishwasher. The pump keeps suitable pressure in the pipes 96 and 124.

A tap water pipe 140 leading from a source of water under pressure is connected through a backflow preventing valve 156 to pipes 142 and 144. The pipe 142 is connected to the valve 99. The pipe 144 is connected to cold water pipe 146 of the kitchen sink and to a pipe 148 connecting an instant, electrical hot water heater 150 connected to a pipe 152 leading to hot water valve 154 of the kitchen sink.

What is claimed is:

1. In a domestic water and waste disposal system including a tap water supply, a sewer, a kitchen sink having a hot water tap, a cold water tap and a drain, a lavatory having a hot water tap, a cold water tap and a drain, a bath having a hot water tap, a cold water tap and a drain, a hot water heater having an inlet and an outlet and a toilet having a cold water inlet and a drain connected to the sewer, the improvement comprising a clarifier tank having an inlet, and outlet and an overflow, filter tank means having an inlet and an outlet,
means connecting the overflow to the sewer,
pump means,
means connecting the inlet of the filter tank means to the pump means,
means connecting the pump means to the outlet of the clarifier tank,
selectively operable means connected by means to the drain of the bath and the lavatory for connecting the drains of the bath and the lavatory to the sewer or to the inlet of the clarifier tank,
means for selectively connecting the inlet of the hot water heater to the tap water supply or the outlet of the filter tank means,
means connecting the outlet of the heater to the hot water taps of the bath and the lavatory,
means connecting the tap water supply directly to the cold water tap of the kitchen sink, and means for selectively connecting the cold water tap of the bath, the cold water tap of the lavatory and the cold water inlet of the toilet to the outlet of the filter tank means or the tap water supply.

2. The system of claim 1 including a source of chlorine and means for introducing chlorine into the clarifier tank.

3. The system of claim 1 including a bypass hose connected to the outlet of the heater and to the cold water taps of the lavatory and the bath and means for connecting the bypass hose selectively to the outlet of the filter tank means and to a branch of the tap water supply, and shutoff valve means in the line from the filter tank means and in the branch of the tap water supply.

4. The system of claim 1 including instant heater means connected to the tap water supply and to the hot water tap of the kitchen sink.

5. In a domestic water and waste disposal system including a first, tap water line, a sewer, a kitchen sink having a hot water faucet, a cold water faucet and a drain, a lavatory having a hot water faucet, a cold water faucet and a drain, a bath having a hot water faucet, a cold water faucet and a drain and a toilet having a bowl with a drain connected directly to the sewer and flush tank means having inlet means, and a heater having an inlet and an outlet, the improvement comprising:

a clarifier tank having an inlet, an outlet and an overflow, filter tank means,
a hot water heater,
a second line connecting the tap water line directly to the cold water faucet of the kitchen sink,
a third line having a shutoff valve therein and connected to the second line,
a fourth line connecting the drains of the bath and the lavatory to the outlet of the filter means and having a shutoff valve therein,
a pump having an inlet connected to the outlet of the clarifier tank and an outlet connected to the filter tank means for forcing water under pressure through the filter tank means,
a fifth line having a branch line connected to the heater and connected to the cold water faucets of the bath and the lavatory and to the inlet means of the flush tank,
and a by-pass line connected to the fifth line and connectible selectively to the third line or the fourth line,
a first drain branch having a shutoff valve therein and connecting the drain line means to the inlet of the clarifier tank,
a bypass drain branch having a shutoff valve therein and connecting the drain line means directly to the sewer,
and a drain line connecting the overflow to the sewer.

* * * * *